April 22, 1924.

P. SCHÜNEMANN

ELECTROMAGNETIC CLUTCH

Filed Feb. 21, 1923    2 Sheets-Sheet 1

1,491,426

Witnesses:

Inventor:
Paul Schünemann
By his Att'y P.H. Richards

April 22, 1924.

P. SCHÜNEMANN

ELECTROMAGNETIC CLUTCH

Filed Feb. 21, 1923    2 Sheets-Sheet 2

Witnesses:

Inventor:
Paul Schünemann
By his Atty

Patented Apr. 22, 1924.

1,491,426

UNITED STATES PATENT OFFICE.

PAUL SCHÜNEMANN, OF EISENACH, GERMANY, ASSIGNOR TO THE FIRM OF MAGNET-WERK G. M. B. H. EISENACH SPEZIALFABRIK FÜR ELEKTROMAGNET-APPARATE, OF EISENACH, GERMANY.

ELECTROMAGNETIC CLUTCH.

Application filed February 21, 1923. Serial No. 620,527.

*To all whom it may concern:*

Be it known that I, PAUL SCHÜNEMANN, a citizen of the German Republic, residing at Eisenach, Saxe-Weimar, Germany, have invented certain new and useful Improvements in Electromagnetic Clutches, of which the following is a specification.

This invention has reference to electromagnetic clutches or coupling means in which the members to be coupled are frictionally engaged with each other by means of the electromagnetic action, thereby causing the operation of the driven member. With excessive stress on the driven member of coupling devices of the kind referred to there is the possibility of the working resistance to be overcome by this member being larger than the frictional resistance of the parts which are forced against each other by the operation of the electromagnet, so as to cause these parts to slip or slide past each other. Though it is not objectionable, broadly speaking, to have the clutch yield in this manner, inasmuch as serious accidents may be avoided thereby, various kinds of damage may result from a prolonged duration of this sliding action in consequence of the high heating occurring thereby.

In view of these facts the invention is intended to provide a clutch or coupling means in which these inconveniences of overload are avoided, and in order to arrive at this result means are provided of interrupting the current which feeds the electromagnet in case of sliding past each other of the engaging members. It is another object of this invention to provide means whereby the interruption of current once produced is maintained even upon the continuation of the rotation of the coupling members with relation to each other, in which case, unless the impediment producing the excessive strain should happen to be removed, the said members would continue to frictionally slide upon each other. The invention is also intended to provide means for insuring the closing of the interrupting gap of the magnet winding circuit upon the engagement of the coupling, and provided the operating resistance of the driven coupling member does not exceed a certain maximum value. The invention also provides means of starting the clutch with a torque in excess of the normal, and it refers in its broad aspects to coupling means or clutches of the kind referred to which are efficient and reliable in operation, may be manufactured at comparatively low expense and economically operated with limited expense for maintenance and repairs. Other objects and advantages of the invention will appear as the specification proceeds and from a reference to the drawings.

The invention is shown in a form of embodiment by way of example on the accompanying drawings in which Figure 1 shows an electromagnetic frictional clutch according to this invention in vertical axial section in the upper part of the drawing and in elevation in the lower part thereof.

Figure 3 is a front elevation showing the combination of the clutch with a switching device in accordance with this invention, while

Figure 1:
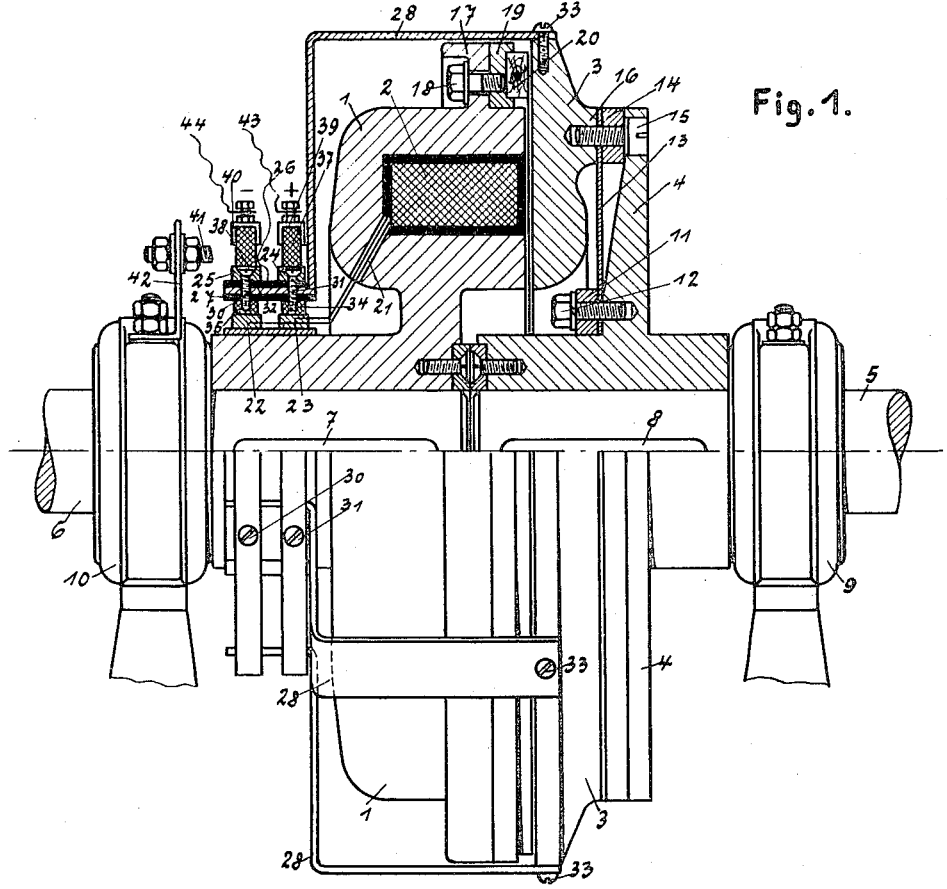

The clutch as shown by way of example comprises in its essential features a magnet 1 with the exciting coil 2, an armature 3 which together with the magnet 1 constitutes the path for the electromagnetic flux, and a support member 4 for the armature 3 which latter is thereby connected to the shaft 5. The other shaft 6 is connected to the magnet 1. Both this connection as well as the connection of the support 4 with the corresponding shaft 5 is effected by means of keys or wedges 7 and 8 in such a manner that the members secured by such wedges are prevented from rotary or axial motion relatively to the shaft. The shafts 5 and 6 are journaled in bearings 9 and 10, respectively. The armature body 3 is disc shaped. Upon the side of the armature disc opposite the magnet 1 a disc of thin steel plate or the like 13 is secured by means of a number of screw bolts 12, by which means the armature body 3 is connected to the support member 4 in such a manner that it is free to be axially and resiliently displaced relatively to the support member, but is prevented from rotation relatively thereto. The connection of the spring actuating sheet metal disc 13 with the armature body 3 is effected by clamping the exterior marginal portion of the disc to the armature by means of a ring 14 which is secured to a correspondingly annular projection 16 of the armature member 3 by a plurality of screw bolts 15 distributed over the periphery. The heads of the bolts 15 are engaged in corresponding sockets of the supporting disc 4, and are free for axial sliding movement in these sockets.

Upon its outer periphery the magnet body 1 is provided with a flange 17 upon which a metal ring 19 is secured by means of screw bolts 18 distributed on the periphery and at the side confronting the armature 3. The ring 19 embraces a tire or ring 20 of wood or of any other suitable frictional material which is adapted for frictional engagement with the opposite portion of the armature disc 3 projecting beyond the periphery of the magnet body 1 proper, as soon as upon the operation of the clutch the armature 3 is attracted by the electromagnet against the spring action of the steel plate disc 13.

Figure 2:
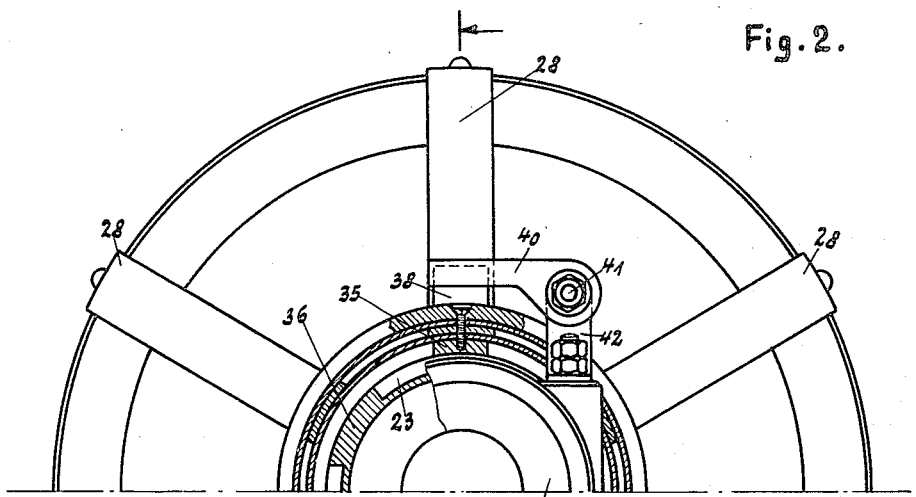
Figure 2 shows the clutch in elevation seen from the left side of Figure 1 with some of the parts broken away.

The wire ends of the exciting coil 2 are conducted through a bore 21 of the magnet body 1 to two exterior metallic slide rings 22 and 23 insulatingly mounted on the hub of the magnet body 1 and secured to it so as to rotate with the body 1. The said slide rings 22 and 23 are spacedly surrounded by other slide rings 24 and 25 respectively which, by means of insulating annular intermediate packing members 26 and 27 are supported by a plurality of arms 28 distributed along the periphery of the clutch. The rings 24 and 25 are secured to the arms 28 by screws 30, 31 which are inserted into the rings from the outside permeating the same, and insulated from the supporting arms 28 by sleeves of insulating material 32. The arms 28 are made to surround the magnet as shown in Figure 1, and at their free ends they are connected to the outer peripheral edge portion of the armature disc 3. At a point on the periphery of the slide rings 24, 25 the fastening screws 30, 31 are passed inwards through the insulating annuli 26 and 27 respectively, and each screw is threadedly secured in a contact piece 34 and 35 respectively. These contact pieces which in the manner of the brushes for electric machines may consist of wire gauze or the like are inwardly extended sufficiently to slide upon the rings 22 and 23, and to establish good electric contact with the same. Each of the rings 22 and 23 is interrupted at a point of its circumference as at 36 (Fig. 2). The gaps thus formed extend circumferentially beyond the circumferential extension of the brushes 34 and 35, and they are filled with sectional pieces of insulating material.

Figure 3:
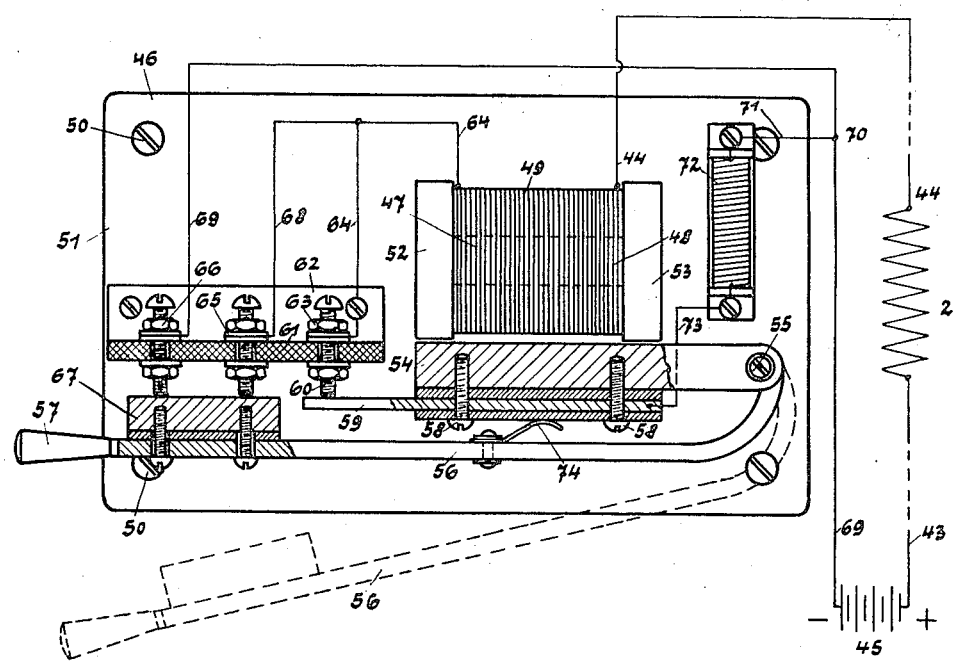
Figure 4:
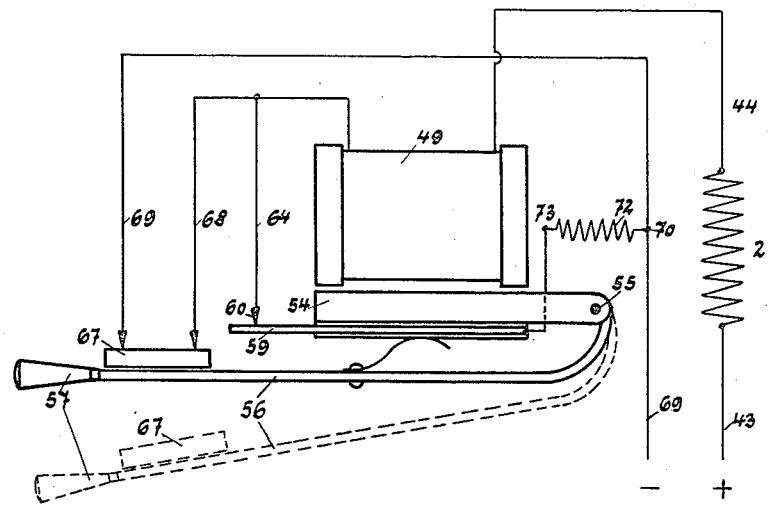
Figure 4 illustrates the connection of the switching means with the coupling clutch, and the switching diagram of the current conductors in a more diagrammatic manner.

Upon each of the exterior rings 24 and 25 one of the contact brushes 37 and 38 is adapted to slide which may also be constructed in the manner of the brushes usually employed in electric machinery, and which are mounted in correspondingly arranged brush holders 39 and 40 respectively. These holders are mounted in the usual manner upon the brush holder supporting stud 41 and are insulated therefrom and from each other. The stud 41 is secured by means of a brush holder support 42 secured to the supporting bearing 10. To the brush holders conductors 43, 44 are connected one of which 43, as shown in Figures 3 and 4 is connected to one terminal of an electric source of energy 45 of any suitable kind. The other conductor 44 is connected to an electromagnetic device, particularly shown in Figure 3, and designated as a whole with reference numeral 46.

This part 46 of the clutch device which by means of screws 50 or the like and by its base plate 51 may be secured to a vertical wall, comprises an electromagnet 47 the core 48 of which is surrounded by a winding 49 to one end of which the conductor 44 is connected. Opposite to the lower ends of the pole shoes 52 and 53 of the electromagnet the armature 54 consisting of a piece of iron is arranged. This armature constitutes a lever fulcrumed at a stud 55 secured to the base plate 51. On the same stud 55 a hand lever 56 is pivotally mounted which extends along the bottom of the armature 54 and projects to the left beyond the same, being provided at its end with a handle 57. Upon the lower side of the armature a contact piece 59 is insulatingly mounted by means of screws 58 the free end of which is adapted to become engaged with a contact pin 60. The pin 60 is insulatingly mounted on the projecting portion 61 of an angular member 62 secured to the base plate 51 from which the part 61 projects. To the contact pin 60 a conductor 64 is connected by means of a screw nut 63 which is connected to the other end of the winding of the electromagnet 49. Upon the projecting lug or web portion 61 two additional contact pins 65 and 66 are secured in the same manner as the pin 60. The ends of these contact pins protruding on the bottom side of the member 61 may become engaged with a contact piece 67 which is insulatingly secured on the top of the hand lever 56 confronting the pins. The contact pin 65 is connected by a conductor 68 to the conductor 64 while the contact pin 66 by a conductor 69 is connected to the minus-terminal of the source of current 45. To the conductor 69 a wire 71 is connected at 70 which leads to a rheostat 72 mounted upon the base plate 51. The rheostat may, however, also be mounted in any other suitable part of the device. The other pole of the rheostat is connected by a conductor 73 to the contact piece 59 of the armature 54. Upon the upper side of the hand lever 56 a flat spring 74 is secured which is engageable with the lower side of the armature 54. In Figures 3 and 4 the electromagnet winding of the clutch is indicated at 2.

The device described operates in the following manner: If it is desired to operate the clutch the hand lever 56 is moved into the position shown in full lines in Figures 3 and 4 of the drawing, by which means by the intermediary of the flat spring 74 the armature 54 is also shifted into the position shown in full lines. In this position the current passes from the plus terminal of the source of current 45 through the conduit 43 to the magnet winding 2 of the clutch, and thence by way of the conductor 44 to the winding 49 of the electromagnet 47, and by way of the conductors 64 and 68 to the contact pin 65, by way of the contact piece 67 to the contact pin 66, and thence by way of conductor 69 back to the minus terminal of the source of current 45. In view of the direct connection of the contact pins 65 and 66 through the contact piece 67 the rheostat is short circuited, so that the full strength of current corresponding to the voltage of the source of current 45 is fed to the winding 2. The armature 3 is therefore attracted with a force corresponding to this strength of current. At the same time this current also acts to excite the winding 49 of the electromagnet 47 causing said electromagnet to attract its armature 54, and to keep the contact closed between the parts 59 and 60, even if the hand lever 56 after the completion of the coupling operation has been dropped, by which means the connection of the contact pins 65 and 66 through the contact piece 67 is interrupted. After this interruption the way of the current is as follows. From the plus terminal of the source of current 45 through the magnet winding 2 of the clutch, conductor 44, winding 49, magnet 47, conductor 64, contact pin 60, contact piece 59, conductor 73, rheostat 72, conductor 71 and conductor 69 back to the minus terminal of the source of current. In consequence of the insertion of the rheostat in the exciting circuit the attraction of the armature 3 of the clutch now becomes less strong, but it is sufficient to produce the frictional force required for the normal operation of the clutch.

Whenever by any circumstances whatever, for instance as a result of disturbances in the machine connected to the driven member of the clutch there is such a heavy strain on the parts that the force of resistance is superior to the frictional force of the coupling members in engagement with each other the driven or secondarily moved member lags behind the driving member, so as to result in a relative movement of the two parts. At a certain time the sliding contacts 34, 35 will therefore become engaged with the insulating intermediate pieces 36 whereby the circuit of the winding 2 of the electromagnet is interrupted so that the electromagnet releases the armature which in consequence of the spring action of the sheet metal disc 13 is removed from the magnet body, so as to interrupt the frictional engagement therewith. This causes the driven member of the clutch to be stopped. Inasmuch as simultaneously with the switching out of the magnet winding interruption occurs likewise at the winding 49 of the magnet 47 the armature 54 drops off, so as to interrupt also the contact between the piece 59 and the contact pin 60. In consequence thereof the exciting current is prevented from being closed again even in case the contact brushes 34, 35 upon the continuing of the rotary movement of the two coupling members relatively to each other are again moved upon the metallic portions of the rings 22 and 23 respectively; the current is permanently interrupted, until the contact is again closed at the points 59, 60 by moving the hand lever 56 from the position shown in dotted lines into the position shown in full lines. If at this moment the contact pieces 34 and 35 should happen to be engaged with the insulating intermediate portions 36 the clutch is not yet operated. The operation is only effected when the contact pieces 34, 35 upon continuing the relative displacement of the coupling members move into engagement with metallic parts of the rings 22 and 23 respectively, whereby the exciting circuit is completely closed. The auxiliary electromagnet 47 has now also been excited, causing the armature 54 to be attracted and keeping the contact 59, 60 closed. In order to start the operation of the clutch with an increase of torque the rheostat 72 which in the normal operation is inserted in the exciting circuit, is short-circuited by the engagement of the contact piece 67 of the hand lever 56 with the contact pins 65, 66.

The invention is evidently not restricted to the particular details and combination of parts herein shown and described merely as an illustration of a particularly advantageous form of embodiment, but it should be understood that it is susceptible of various modifications without deviating from the broad idea of the invention. Thus for example it is not absolutely necessary that the interruption of the exciting current by the relative displacement of the two coupling members, as shown, takes place at two points, that is to say between the brush 34 and the slide ring 22, and on the other hand between the brush 35 and its corresponding slide ring 23, for it is sufficient to merely interrupt one of the conductors leading to the winding 2. It is also to be understood that the particular shape and formation of the clutch itself may assume any suitable form and configuration, it being only essential that the interruption of the exciting current is effected by the relative movement of the coupling members.

I claim:—

1. In an electromagnetic clutch, two frictionally engageable coupling members, a circuit comprising an exciting coil, and means adapted to cause the interruption of said circuit on said coupling members being rotated relatively to each other.

2. In an electromagnetic clutch, two frictionally engageable coupling members, a circuit containing an exciting coil and a normally closed electrical contact, and a member connected to each of said coupling members and adapted to cause the interruption of said contact on said coupling members rotating relatively to each other.

3. In an electromagnetic clutch, two frictionally engageable coupling members, a circuit comprising an exciting coil, a contact face arranged in mechanically connected relation to one of said coupling members, and a contact piece adapted to slidingly engage said contact face, said contact piece being connected to the other one of said coupling members, interruption means in combination with said contact face adapted to cause the breaking of the engagement between said contact piece and said contact face.

4. In an electromagnetic clutch, two frictionally engageable coupling members, a circuit comprising an exciting coil, a metallic annular member connected to one of said coupling members, said annular member having a nonconducting interruption gap, a contact piece connected to the other one of said coupling members and adapted to slidingly engage said annular member, and means for electrically connecting said annular member and said contact piece to said circuit.

5. In an electromagnetic clutch, two frictionally engageable coupling members, an exciting coil, a metallic ring connected to one of said coupling members and having an interrupting sector of insulating material, a second metallic ring in associated relation to said first named ring, supporting means connecting said second ring to the other one of said coupling members, a contact piece electrically connected to said second ring and adapted to slidingly engage said first named ring, means for electrically connecting said first named ring to one terminal of said exciting coil, and means for leading electric current to the other terminal of said exciting coil and to said second ring.

6. In an electromagnetic clutch, two frictionally engageable coupling members, a circuit containing an exciting coil and two normally closed contacts, means adapted to cause interruption of one of said contacts on said coupling members rotating relatively to each other, and means adapted to open the second one of said contacts in dependency on said first named means.

7. In an electromagnetic clutch, two frictionally engageable coupling members, a circuit containing an exciting coil and two normally closed contacts, means adapted to cause interruption of one of said contacts on said coupling members rotating relatively to each other, and means adapted to open the second one of said contacts on the first of said contacts being interrupted, but not to close said second contact on said first contact being closed.

8. In a device of the character described, two coupling members rotatable relatively to each other, an auxiliary electromagnet having an auxiliary coil and an auxiliary armature, an exciting coil, two contacts, said auxiliary coil, said exciting coil and said contacts being electrically inserted in series in a common circuit, and means adapted to cause interruption of one of said contacts on said coupling members rotating relatively to each other, said auxiliary armature adapted to maintain the second of said contacts closed on said auxiliary coil being energized and to open said second contact on said auxiliary coil being de-energized.

9. In a device of the character described, two coupling members rotatable relatively to each other, an auxiliary electromagnet having an auxiliary coil and an auxiliary armature, an exciting coil, two contacts, said auxiliary coil, said exciting coil and said contacts being electrically inserted in series in a common circuit, means adapted to cause interruption of one of said contacts on said coupling members rotating relatively to each other, said auxiliary armature adapted to maintain the second of said contacts closed on said auxiliary coil being energized and to open said second contact on said auxiliary coil being de-energized, and additional means allowing the closing at will of said second contact.

10. In a device of the character described, two coupling members rotatable relatively to each other, an auxiliary electromagnet having an auxiliary coil and an auxiliary armature, an exciting coil, two contacts, said auxiliary coil, said exciting coil and said contacts being electrically inserted in series in a common circuit, means adapted to cause interruption of one of said contacts on said coupling members rotating relatively to each other, said auxiliary armature adapted to maintain the second of said contacts closed on said auxiliary coil being energized and to open said second contact on said auxiliary coil being de-energized, and hand lever means adapted on being actuated to engage said auxiliary armature so as to cause it to close said second contact and on being released to automatically become free from said auxiliary armature.

11. In a device of the character described, two coupling members rotatable relatively to each other, an auxiliary electromagnet having an auxiliary coil and an auxiliary armature, an exciting coil, two contacts, said auxiliary coil, said exciting coil and said contacts being electrically inserted in series in a common circuit, means adapted to cause interruption of one of said contacts on said coupling members rotating relatively to each other, said auxiliary armature adapted to maintain the second of said contacts closed on said auxiliary coil being energized and to open said second contact on said auxiliary coil being de-energized, and additional means allowing the closing at will of said second contact, a rheostat normally being inserted in said circuit in series with said exciting coil, means for disconnecting said rheostat from said circuit, said disconnecting means being under the control of said additional means.

12. In an electromagnetic clutch, two frictionally engageable coupling members, a circuit comprising an exciting coil, automatically acting means adapted to interrupt said circuit on said coupling members rotating relatively to each other and means adapted to automatically maintain the circuit in an open condition on said coupling members continuing to rotate relatively to each other.

13. In an electromagnetic clutch, two frictionally engageable coupling members, a circuit containing in series a magnet coil, a second magnet coil, a contact and a rheostat, and additional means for closing at will said contact, an armature in closed relation to said second magnet coil and being adapted to close said contact on said second magnet coil being energized and to open said contact on said second magnet coil being de-energized.

14. In an electromagnetic clutch, two frictionally engageable coupling members, a circuit comprising in series a magnetic coil, a second magnetic coil, a contact and a rheostat, and a hand lever adapted on being actuated to close said contact and to short-circuit said rheostat.

15. In an electromagnetic clutch, two frictionally engageable coupling members, a circuit comprising in series a magnetic coil, a second magnetic coil, a contact and a rheostat, a hand-lever adapted on being actuated to close said contact and to short-circuit said rheostat, and a second contact in said circuit being in series to said first named contact and adapted to open on said coupling members rotating relatively to each other.

16. In an electromagnetic clutch, two frictionally engageable coupling members, an exciting coil, a metallic ring connected to one of said coupling members and having a nonmetallic sectional portion on its periphery; a second metallic ring concentrically surrounding said first named ring, a plurality of supporting arms connecting said second ring to the other one of said coupling members and embracing the said one of said coupling members, sliding contact means adapted to electrically connect said rings one to another, means for electrically connecting said first named ring to one terminal of said exciting coil and means for leading electric current to the other terminal of said exciting coil and to said second ring.

In testimony whereof I affix my signature in presence of two witnesses.

PAUL SCHÜNEMANN.

Witnesses:
RUDOLPH FRICKE,
GORDON A. HOPKINS.